(12) United States Patent
Haibach et al.

(10) Patent No.: US 11,040,466 B2
(45) Date of Patent: Jun. 22, 2021

(54) INDUCTIVELY HEATED MOLD FOR PERSONAL USE

(71) Applicant: KONINKLIJKE PHILIPS N.V., Eindhoven (NL)

(72) Inventors: Richard Thomas Haibach, Verona, PA (US); Anthony Vincent Startare, Belle Vernon, PA (US); Gregory John Jablonski, Butler, PA (US)

(73) Assignee: Koninklijke Philips N.V., Eindhoven (NL)

( * ) Notice: Subject to any disclaimer, the term of this patent is extended or adjusted under 35 U.S.C. 154(b) by 213 days.

(21) Appl. No.: 16/018,740

(22) Filed: Jun. 26, 2018

(65) Prior Publication Data

US 2018/0370078 A1 Dec. 27, 2018

Related U.S. Application Data

(60) Provisional application No. 62/525,320, filed on Jun. 27, 2017.

(51) Int. Cl.
*B29C 33/06* (2006.01)
*B29C 33/38* (2006.01)
(Continued)

(52) U.S. Cl.
CPC .............. *B29C 33/06* (2013.01); *B29C 33/38* (2013.01); *B29C 33/3842* (2013.01);
(Continued)

(58) Field of Classification Search
CPC ......... B29C 33/00; B29C 39/26; B29C 33/38; B29C 33/02; B29C 33/023; B29C 33/06;
(Continued)

(56) References Cited

U.S. PATENT DOCUMENTS 2,626,428 A 1/1953 Bosomworth
6,209,542 B1 4/2001 Thornton
(Continued)

FOREIGN PATENT DOCUMENTS

JP H3010811 A 1/1991
JP 2011230445 A * 11/2011
(Continued)

OTHER PUBLICATIONS

Machine translation of JP2011230445A, Nov. 2011.*

*Primary Examiner* — Philip C Tucker
*Assistant Examiner* — Jimmy R Smith, Jr.
(74) *Attorney, Agent, or Firm* — Michael W. Haas

(57) ABSTRACT

The present application describes a system for curing moldable material. The system comprises an energy source, a mold, and/or other components. The mold comprises internal mold surfaces forming a mold cavity. The mold is formed from one or more materials configured to absorb electromagnetic radiation emitted by the energy source. The mold has a hot zone and a cold zone. The hot zone and the cold zone have the one or more materials thereof comprising at least one different physical characteristic so that the hot zone and the cold zone absorb the electromagnetic radiation at different rates and/or in different amounts. The hot zone absorbs more electromagnetic radiation than, and/or electromagnetic radiation faster than, the cold zone.

8 Claims, 5 Drawing Sheets

(51) Int. Cl.
  *B29C 39/38* (2006.01)
  *B29C 35/08* (2006.01)
  *B29C 39/26* (2006.01)
  *B33Y 10/00* (2015.01)
  *B33Y 80/00* (2015.01)
  *B29K 63/00* (2006.01)
  *B29C 39/00* (2006.01)
  *B29K 83/00* (2006.01)
  *B29L 31/00* (2006.01)
  *B29C 39/24* (2006.01)
  *B29C 39/18* (2006.01)

(52) U.S. Cl.
  CPC .......... *B29C 35/0805* (2013.01); *B29C 39/26* (2013.01); *B29C 39/38* (2013.01); *B29C 33/3828* (2013.01); *B29C 39/006* (2013.01); *B29C 39/18* (2013.01); *B29C 39/24* (2013.01); *B29C 2033/385* (2013.01); *B29C 2035/0811* (2013.01); *B29C 2035/0822* (2013.01); *B29C 2035/0833* (2013.01); *B29C 2035/0855* (2013.01); *B29K 2063/00* (2013.01); *B29K 2083/005* (2013.01); *B29K 2995/0003* (2013.01); *B29L 2031/757* (2013.01); *B33Y 10/00* (2014.12); *B33Y 80/00* (2014.12)

(58) Field of Classification Search
  CPC ....... B29C 35/00; B29C 35/002; B29C 35/02; B29C 33/3807; B29C 33/3828; B29C 33/3842; B29C 2035/0855; B29L 2031/757

USPC .............................. 425/174.4, 174.8, 174.8 R
  See application file for complete search history.

(56) References Cited

U.S. PATENT DOCUMENTS

| | | |
|---|---|---|
| 6,464,924 B1 | 10/2002 | Thornton |
| 6,812,271 B2 | 11/2004 | Swartz |
| 6,855,410 B2 | 2/2005 | Buckley |
| 7,243,650 B2 | 7/2007 | Thornton |
| 7,909,035 B2 | 3/2011 | Thornton |
| 7,963,284 B2 | 6/2011 | Thornton |
| 8,020,276 B2 | 9/2011 | Thornton |
| 8,236,216 B2 | 8/2012 | Thornton |
| 8,485,190 B2 | 7/2013 | Barnett |
| 9,295,299 B2 | 3/2016 | Leary |
| 2009/0267264 A1* | 10/2009 | Tranter ............... B29C 35/0266 264/234 |
| 2011/0163480 A1* | 7/2011 | Herkner |
| 2012/0055485 A1 | 3/2012 | Anthony |
| 2014/0326243 A1 | 11/2014 | Znamenskiy |
| 2015/0054204 A1* | 2/2015 | Tseliakhovich ......... B29C 64/20 264/489 |

FOREIGN PATENT DOCUMENTS

| | | |
|---|---|---|
| JP | 2011230445 A | 11/2011 |
| WO | WO2008140567 A2 | 11/2008 |
| WO | WO-2009138782 A2 * | 11/2009 |
| WO | 2016124432 A1 | 8/2016 |
| WO | 2016170003 A1 | 10/2016 |

* cited by examiner

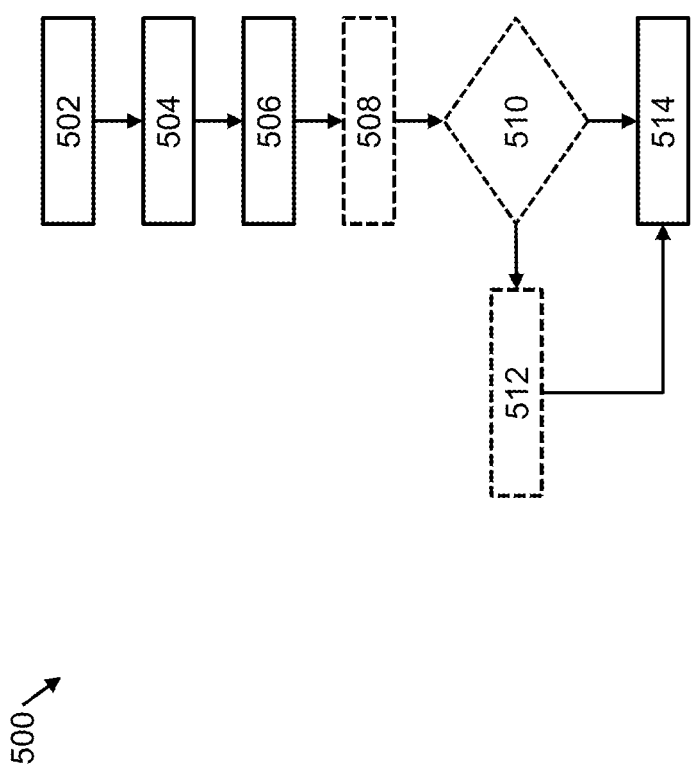

INDUCTIVELY HEATED MOLD FOR PERSONAL USE

CROSS-REFERENCE TO RELATED APPLICATIONS

This patent application claims the priority benefit under 35 U.S.C. § 119(e) of U.S. Provisional Application No. 62/525,320 filed on Jun. 27, 2017, the contents of which are herein incorporated by reference.

BACKGROUND

1. Field

The present disclosure pertains to a system for curing thermo-sensitive materials in molds.

2. Description of the Related Art

Curing materials in a mold to achieve the shape and characteristics of a final molded part is known. This process typically takes long periods of time at room temperature. Addition of heat to a molded part may decrease the time before a molded part cures. Typical methods of curing materials with external heat often result in uneven heating of the molded material. Uneven heating may result in damage to the mold and/or to the molded material.

SUMMARY

Accordingly, one or more aspects of the present disclosure relate to a system for curing moldable material. The system comprises a mold, and/or other components. The mold comprises internal mold surfaces forming a mold cavity. The mold may be formed from one or more materials configured to absorb electromagnetic radiation emitted by an energy source. The mold has a hot zone and a cold zone. The hot zone and the cold zone have the one or more materials thereof comprising at least one different physical characteristic so that the hot zone and the cold zone absorb the electromagnetic radiation at different rates and/or in different amounts. The hot zone absorbs more electromagnetic radiation than, and/or absorbs electromagnetic radiation faster than, the cold zone.

Another aspect of the present disclosure relates to a method of making a mold. The method comprises selecting a first material for a hot zone of the mold; selecting a second material for a cold zone of the mold; and forming the mold, wherein the hot zone adjoins the mold cavity, and wherein the cold zone at least partially encloses the hot zone.

Yet another aspect of the present disclosure relates to a system for curing moldable material. The system comprises means for shaping the material and/or other components. The means for shaping the material comprising means for retaining moldable material against the means for shaping the material; a first means for absorbing electromagnetic radiation from a means for generating electromagnetic radiation; and means for retaining heat generated by the means for absorbing electromagnetic radiation.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 5 depicts a flow diagram of a method for making an embodiment of a mold.

DETAILED DESCRIPTION OF THE INVENTION

Figure 1:
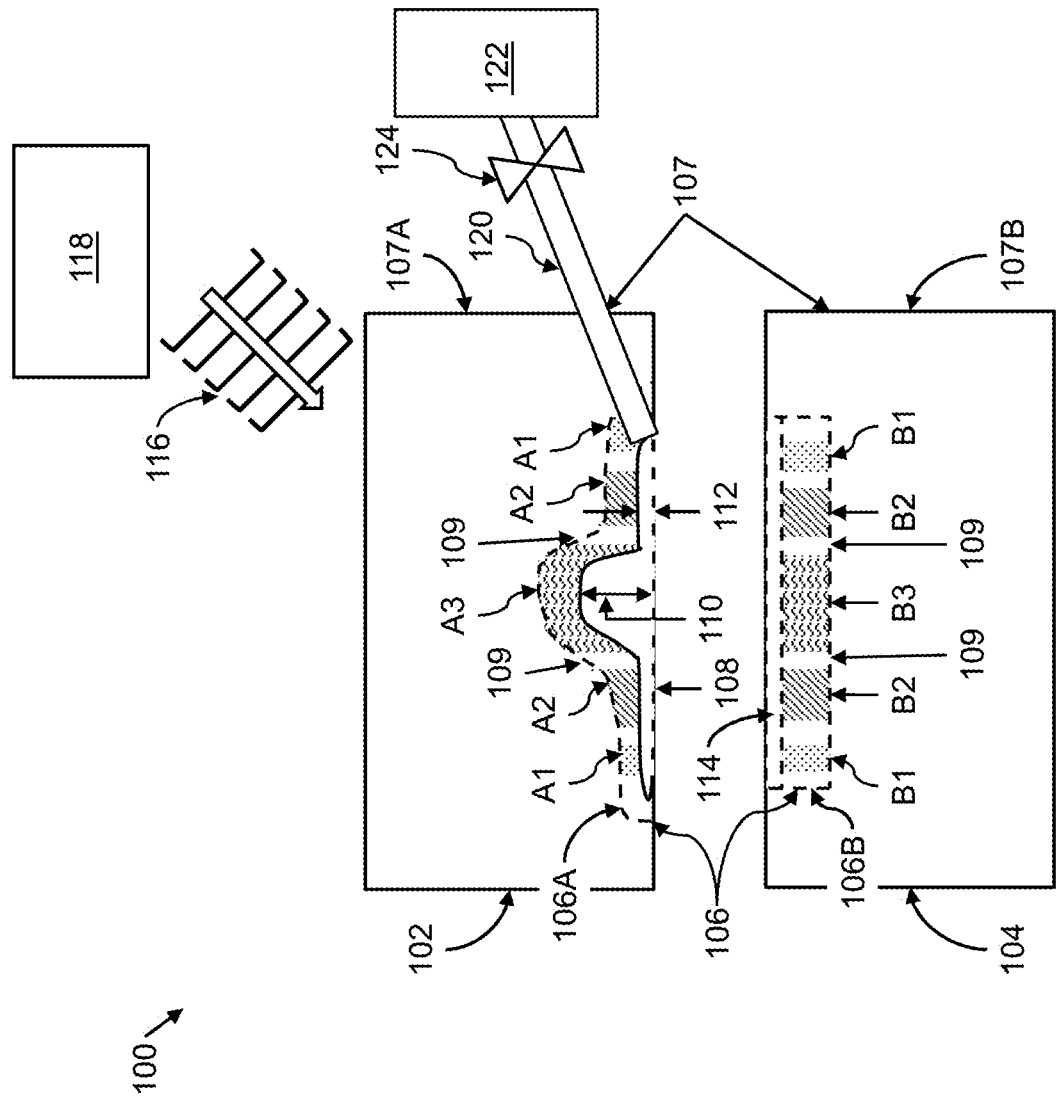
FIG. 1 depicts a cross-sectional diagram of an embodiment of a mold.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present disclosure describes a mold for curing moldable material. The disclosure describes an energy source, a mold, and/or other components (shown in FIG. 1-5 and described below). The mold comprises internal mold surfaces forming a mold cavity. The mold is formed from one or more materials configured to absorb electromagnetic radiation emitted by the energy source. Different regions of the mold are configured to absorb the electromagnetic radiation at different rates and/or in different amounts. For example, some regions of the mold absorb more electromagnetic radiation than, and/or absorb electromagnetic radiation faster than, other regions of the mold. This facilitates localized areas of a mold with varying levels of microwave absorption that can be customized depending on the part to be molded. For example, areas of the mold where a plastic piece may be overmolded can utilize a mold material that has poor microwave absorption and does not heat up. Areas of the mold where thick silicone is to be cured may be formed from a high absorption mold material. Areas of the mold where thin material is to be cured may be formed from a blend and/or other materials which absorb less microwave energy.

Vulcanization or curing of moldable materials involves solidifying a material (e.g., liquid, semi-solid, molten, etc.) to have the moldable material retain a shape. Cured materials may be rigid or pliable. Material curing may include light-induced processes or chemically-induced processes. Curing may occur following exposure of a moldable material to a chemical such as oxygen, water vapor, or sulfur. Light-induced curing may be triggered by exposure of a moldable material to a light frequency that prompts a cross-linking reaction in the moldable material. In some implementations, the light frequencies that trigger curing may be ultraviolet light.

Some curing processes may be sensitive to thermal conditions of the moldable material during curing. In room temperature vulcanization (RTV), a moldable material cures at room temperature (around about 20° C.) without exposure to higher temperatures. At room temperature, curing processes may proceed at lower rates than when the moldable material being cured is at a temperature greater than room temperature. While some room temperature vulcanization processes may proceed to completion over many hours, curing of materials at higher temperatures may proceed to completion in a matter of minutes. Temperatures suitable for curing some moldable materials may range from about 20° C., to about 100° C., or even higher. Addition curing, such as curing using a precious metal catalyst such as platinum, may be significantly accelerated by raising the temperature of the moldable material.

Methods of applying heat to moldable materials during curing may include direct thermal stimulation and indirect stimulation. Direct thermal stimulation may involve direct application of heat to an external mold surface and conduction of heat through the mold into moldable material in a mold cavity. Direct thermal stimulation may be performed on metal molds having a plurality of pieces, the interior surfaces of which form a mold cavity. Metal mold pieces may conduct heat quickly from the external mold surface into the moldable material to accelerate curing of moldable material.

Indirect stimulation may include electromagnetic stimulation of a mold or mold material using electromagnetic radiation emitted by an energy source. Susceptance is the characteristic of a material whereby the material is heated upon exposure to electromagnetic radiation. One example of susceptance is microwave susceptance, where materials heat after absorbing microwave radiation emitted by an energy source. Some materials may have very low microwave susceptance and not undergo significant temperature gains when stimulated by microwave radiation, while other materials may become much warmer upon similar microwave radiation stimulation. Heating of materials by electromagnetic stimulation may result in non-uniform heating patterns. In one non-limiting implementation of indirect stimulation, a microwave generator of a microwave oven may produce microwave radiation that penetrates into a mold filled with moldable material to cause heating. Other wavelengths of electromagnetic radiation are included within the scope of the present disclosure, including optical wavelengths and infrared wavelengths. A mold compatible with electromagnetic stimulation may include non-metallic mold pieces having little or no metal therein. Indirect stimulation-compatible mold pieces may be made of non-metallic compounds that are formed into rigid mold pieces.

In one non-limiting example, a mold suitable for indirect stimulation may have a clamshell shape and comprise a shaped plastic first (e.g., upper) piece, a shaped plastic second (e.g., lower) piece, and a plastic pin and/or other components configured to hold the first (upper) and second (lower) piece together during a curing process. In some embodiments, such components (the first piece, second piece, pin, etc.) may have a low microwave susceptance such that they are not heated by the microwaves and instead facilitate passage of energy from the microwaves into moldable material held by the components to cure the moldable material. In some embodiments, such components and/or local areas of such components form "cold zones" of a mold (e.g., areas that remain cool enough in temperature so that they may be handled by a user). In some embodiments, such components (the first piece, second piece, pin, etc.) may have a high microwave susceptance, and/or localized areas of high microwave susceptance such that they are heated by the microwaves and radiate heat themselves into the moldable material held by the components to cure the moldable material. In some embodiments, such components and/or local areas of such components may form "hot zones" of a mold (e.g., areas that warm enough to radiate heat into the moldable material to facilitate curing of the moldable material). These examples are further described below.

Non-metallic compounds may be formed into mold pieces (the first piece, the second piece, pin, etc.) by stamping, pressing, printing (using three-dimensional (3D) printers), machining, or other methods of shaping organic materials. Resins, plastics, polymers and other organic compounds may be amenable to shaping into mold pieces compatible with indirect stimulation techniques. In some embodiments, mold pieces that include glass and other metal-free inorganic compounds may be used in indirect stimulation processes.

As described above, some mold piece configurations may be used in indirect stimulation processes because the moldable material in a mold cavity may be heated by the electromagnetic radiation emitted from the energy source without heating of the mold pieces themselves. Mold pieces may be configured to allow passage of electromagnetic radiation through the mold material into the moldable material. Some mold piece configurations may be used in indirect stimulation processes because the mold material, not the moldable material in a mold cavity, may be heated by the electromagnetic radiation emitted from the energy source, and the heat from the electromagnetic stimulation of the mold pieces may be conducted into moldable material contained by the mold pieces. As described herein, different materials heat up at different rates in a microwave. A material that absorbs microwaves well relative to other materials is called a susceptor. For example, a material with retained water moisture will heat up more quickly than other materials without retained water moisture. Materials having a resonant frequency that is a multiple of the microwave frequency will heat well. Mild conductors will also heat well. Materials containing carbon particles and/or metal particles will also heat rapidly relative to other materials.

In some implementations of curing processes, the susceptance of material for use in a hot zone of a mold may be more than about 1.5 times the susceptance of material in a cold zone of a mold. A susceptance of material may impact curing temperatures of moldable material. Curing temperature of moldable material may relate to the total electromagnetic stimulation time of the mold around the moldable material, and relating to the amount of susceptor material in parts of the hot zone where electromagnetic stimulation occurs. In some implementations of curing processes, mold material may have a susceptance lower than about 0.0001° C./(W*s*cm$^3$). In some instances, susceptance of a mold material in a hot zone and/or a cold zone may range from about 0.0003° C./(W*s*cm$^3$) to about 0.00001° C./(W*s*cm$^3$).

In a non-limiting embodiment, polysiloxane precursor materials that form silicones, or silicone rubber, may be difficult to heat by electromagnetic stimulation (e.g., silicone does not heat in the microwave and therefore will not cure unless in contact with a mold surface that is heated). However, a mold may be configured to undergo heating and the heat generated may be conducted into the precursor material to accelerate curing. A low-susceptance material such as an addition-cured polysiloxane that might otherwise fully cure after multiple hours at room temperature may be fully cured in less time (e.g., less than one hour) upon sufficient heat transferring to the moldable material from an electromagnetically heated mold. Moldable materials that may benefit from accelerated curing times with exposure to heat during curing may include elastomers, resins, silicones, and epoxies.

Direct and indirect stimulation of mold pieces may result in non-uniform curing and damage to moldable material. Curing may be slower to complete in large volumes of a mold cavity than in small volumes of the mold cavity. Uneven curing may result from differences in the thermal exposure of the mold material in partial-volumes of the mold cavity. Different thermal exposure may result in different a peak temperature to which a moldable material may be heated in different volumes of the mold cavity (a temperature differential across the moldable material). Different thermal exposure may result in different duration of thermal exposure above room temperature (about 20° C.) and/or other temperatures of different volumes of the mold cavity. A temperature differential across the moldable material may be associated with wall thickness and thermal conductivity of the mold pieces, and/or other factors. For example, heat may penetrate into the mold cavity more quickly when the thermal conductivity is large, and/or when the mold walls are thin, than when the thermal conductivity of the mold material is small, and/or when the mold walls are thick, near a volume of the mold cavity. In one non-limiting example, a mold with thick walls in one mold region may exhibit slower heat transfer to moldable material near the thick walls than occurs in a mold region having thin walls.

Further, non-uniform curing may occur as a function of the dimension of a volume of the mold cavity, in addition to any thermal effects described above. Diffusion of heat across a large-dimension volume of a mold cavity may be slower than heat diffusion across a small-dimension volume of the mold cavity. The time associated with diffusion of heat through the moldable material may also influence the time for complete curing of the moldable material in a mold cavity.

Damage to a molded part may result from removal of the molded part from the mold cavity before curing may be complete. Damage associated with premature part removal may include part deformation and other permanent damage. Damage to molded parts may also result from uneven thermal exposure of the molded part. Portions of molded parts that are exposed to temperatures larger than the average temperature of a molded part during a curing process may be burned, discolored, melted, or degraded because of the temperature differential.

Mold pieces of the present system may be configured to have different thermal characteristics in different volumes of the mold pieces in order to address non-uniform curing and damage associated with non-uniform thermal exposure during a curing process. Mold pieces may be intentionally configured with different thermal characteristics in different regions of the mold pieces to achieve the compensating effect. The compensating effect may result from non-uniform heating of the mold piece. Non-uniform heating of mold pieces may be facilitated by combining different materials into a single mold piece, locally changing the dimensions of mold pieces, and/or using other operations.

Thermoset materials like silicones are traditionally cured in a metal compression or injection mold. These molds can be easily heated but are very expensive to make. Therefore they are not practical for small scale or custom products. Three-dimensionally printed molds offer a significant cost advantage but are very difficult to heat because the materials typically available for 3D printing have strong insulating properties.

However, the present system facilitates customization of 3D printed and/or other molds for microwave heating. In some embodiments, the present system facilitates mold printing using polyjet and/or other printers which facilitate blending and printing of multiple materials in substantial unison. In one non-limiting embodiment, materials may be combined into a mold piece by a three dimensional (3D) printing process. A 3D printing process allows for fine control of the distribution of different materials in a printed object. Because different materials may have different thermal characteristics, 3D printing may generate volumes of a mold made of single materials, or mixtures of materials.

Some materials that may be used in 3D printing of mold pieces may include organic polymers such as polyurethanes, polystyrenes, polyesters, polypropylenes, polycarbonates, cyanates, acrylics, and epoxides. Different thermal characteristics of mold materials may arise from the chemical composition of the materials, the density of the materials after curing, and/or other factors. For example, thermal conductivity of a material may be related to functional groups on polymer chains and the interlinking of polymerized molecules. Heat capacity of a material may be related to a chemical structure of a material and the ways that a molecular structure can dissipate energy in a molecule as the material may be indirectly stimulated by electromagnetic radiation. Some of these 3D printable materials can be very rapidly heated in the microwave. Because of their insulating properties, they also retain the heat very effectively and can continue to cure the material long after the microwave cycle has finished.

In some embodiments of the present system, thermal characteristics of a first mold material used to form a first portion of a mold (e.g., an outer portion handled and/or touched by a user) may differ from the thermal characteristics of a second mold material used for form a second portion of the mold (e.g., a portion of the mold that immediately surrounds the moldable material). A first material deposited at a concentration of 100% in a region of a mold may have a different thermal characteristic than a thermal characteristic of a mold region that includes 50% of a first material and 50% of a second material. A combination of materials may have a thermal characteristic intermediate to the values of the characteristics of the individual materials when used at a 100% concentration.

In some embodiments, the different thermal characteristics may be associated with the pattern of material deposition during a mold making process. Material may be deposited at interspersed points or in lines (these examples are not intended to be limiting) of a first material embedded in a region of a second material. In some embodiments, materials may be deposited in layers parallel to a mold surface. Other variations of material deposition patterns may be envisioned by one having ordinary skill in the art in order to modulate thermal characteristics of a region of a mold near an interior surface of the mold.

Heating of mold materials may also result from materials (e.g., additives, dopants, and/or other additional materials) that are incorporated into a mold material during a mold formation process. For example, doped zinc oxide may be added to a mold material as an additive to facilitate heating of a particular part of a mold. Mold materials may be single-component materials or may be mixtures of materials. Three-dimensional printing may be one method of depositing mixtures of materials, or combinations of materials, in a mold for indirect stimulation. Mixtures or combinations of materials may include solid materials suspended in a formulation of 3D printing material. Some materials incorporated into a mold may be accidental dopants. For example, water may become trapped in mold materials during mold formation, making the mold material more susceptible to heating on exposure to forms of electromagnetic radiation such as microwave radiation.

Solid materials suspended in a formulation of 3D printing material may include deliberate dopants such as inorganic and organic particles, including metal particles, non-metallic inorganic materials, and organic (primarily carbon) particles. Inorganic particulates may include metal particles, ceramic particles, and other solid materials. Dopants may include conductive particles such as metal particles, metal filings, or conductive organic compounds such as carbon fibers. Dopants may be included in mold materials used for three-dimensional printing in order to provide structural strength or desired physical characteristics to the mold material, including compressive strength, tensile strength, stability at elevated temperatures, elasticity, and color.

As described above, in some embodiments, thermal characteristics of a mold material may vary according to a dimension for the mold cavity near a part of the mold material. Mold pieces may be configured to have larger peak temperatures adjoining large volumes of a mold cavity in order to accelerate curing of moldable material in the large volume of the mold cavity more than heating accelerates curing in a smaller volume of the mold cavity. By regulating the peak temperature of mold material adjacent to a volume of a mold cavity, moldable material in large volumes of the mold cavity may cure proportional to the curing of moldable material in small volumes of the mold cavity. More uniform curing of molded parts may reduce damage associated with removing uncured parts from a mold cavity. Larger peak temperatures may be associated with materials in the mold that have a greater propensity to absorb electromagnetic radiation from an energy source, or a lower heat capacity (such that energy absorbed transfers more readily to a moldable material in a mold cavity rather than heating the mold material itself). Larger peak temperatures of moldable material may also be associated with larger thermal conductivity of a material near a portion of mold cavity. More rapid conduction of heat into a mold cavity may result in lower temperatures of the mold during heating of moldable material located therein.

FIG. 1

FIG. 1 depicts a cross-sectional diagram of an embodiment of a mold 100 having different thermal characteristics in different regions of the mold. The different regions of the mold may be associated with regions of the mold cavity having different dimensions. Mold 100, as depicted, has a clamshell appearance, with a first piece 102 and a second piece 104 that may be coupled to the first piece. Moldable material may be introduced into a mold cavity 108 through a supply line 120. Moldable material in source reservoir 122 may enter mold cavity 108 upon opening of valve 124, and flow of moldable material may cease upon closure of the valve 124. Although the description herein may relate to depictions of a clamshell mold, a supply line with a valve, and/other components, other embodiments of multi-piece molds may be envisioned and fall within the scope of the present disclosure, as will be understood by a person of ordinary skill in the art.

Mold 100 includes a hot zone 106, including hot zone regions 106A-B, and a cold zone 107 that includes cold zone regions 107A-B. Hot zone 106 may be a region of the mold susceptible to a greater degree of heating upon indirect stimulation than a cold zone 107. Indirect stimulation of the hot zone by electromagnetic radiation 116 emitted from an energy source 118 may heat the hot zone in anticipation of the generated heat diffusing into moldable material in a mold cavity. First hot zone 106A and second hot zone 106B contain multiple hot zone regions A1-A3 and B1-B3, respectively. Hot zone regions A1-A3 and B1-B3 may be configured to have at least one different thermal characteristic (e.g., caused by differences in material properties, dimensions, etc. as described below) among them to promote heating of the moldable material and induce a temperature differential in the mold 100. A hot zone may be configured to produce a temperature differential in the hot zone (e.g., such that regions A1-A3 and/or B1-B3 are the same or different temperatures) upon electromagnetic stimulation in order to address uneven curing of moldable material in a mold cavity.

In a non-limiting example, hot zone region A3 may, upon stimulation by electromagnetic radiation, achieve a greater peak temperature than either of hot zone regions A1 and A2. Similarly, hot zone region B3 may achieve a greater peak temperature than either of hot zone regions B1 and B2. Hot zone regions A3 and B3 may achieve a same peak temperature in some implementations of curing processes. Hot zone regions A3 and B3 may achieve different peak temperatures according to at least one different thermal characteristic of hot zone 106A and 106B. Hot zones A3 and B3 may be configured to achieve a greater peak temperature than other hot zone regions because they adjoin mold cavity 108 at a location having a large dimension 110. Hot zones A1-A2 and B1-B2 may achieve lower peak temperatures than hot zone regions A3 and B3 because they adjoin mold cavity 108 at a location having a smaller dimension 112. A higher peak temperature of a hot zone region adjoining a large-dimension volume of a mold cavity may accelerate curing therein to a greater degree than a lower peak temperature in a hot zone region such as hot zone regions A2 and B2, adjoining a small-dimension volume of a mold cavity. Curing may complete at a more uniform time across a molded part than a similar part cured with a mold not having the different thermal characteristic therein. In some embodiments, in addition to and/or instead of reliance of the position of a region relative to mold cavity dimensions, such temperature differences may be facilitated by using different materials (e.g., with different susceptences) in the different regions, changing the dimension of the material in these areas, and/or using other methods as described below.

Electromagnetic radiation 116 emitted from an energy source 118 may be distributed evenly around mold 100 to heat the hot zone regions. In some embodiments, the present system includes energy source 118. In some embodiments, energy source 118 may be a stand-alone device. In some embodiments, energy source 118 is not part of the system, but a separate device provided by a third party manufacturer, for example. In some embodiments the energy source 118 may be a microwave oven and the electromagnetic radiation 116 generated thereby may emanate from an oven cavity and be absorbed by a mold or a moldable material. Non-uniform heating of hot zones 106a and 106B may be influenced to a greater degree by the different thermal characteristic through the respective hot zones, or the hot zone regions A1-A3 and B1-B3 thereof, rather than the distribution of electromagnetic radiation through and around the mold during operation of the energy source.

A hot zone may extend directly to an interior surface of a mold, and/or may be separated from the mold cavity by an optional buffer volume 114. A buffer volume may be employed in a mold design to allow lateral distribution of heat through the buffer volume at locations of optional spacer volumes 109 between hot zone regions and/or for other reasons. Lateral distribution of heat through the buffer volume may allow for more even curing of moldable material at against the interior surface of the mold cavity, rather than have zones of different curing completion against the interior surface of the mold.

A cold zone 107 of a mold may have a first cold zone part 107A and a second cold zone part 107B that promote heat retention in the hot zone 106 during a curing process, handling of mold 100 by a user, and/or other operations. The cold zone may be configured to absorb less electromagnetic radiation than the hot zone (and the moldable material in cavity 108) in order to minimize exterior heating of mold 100. Cold zone material may insulate the hot zones and mold cavity 108 from an exterior surface of a mold to facilitate manipulation of a heated mold 100. Cold zone material may be formed into handles or grips to position and manipulate the mold pieces during assembly, or when removing the mold from an energy source while at temperatures above room temperature, for example. Cold zone material may be selected from among materials having higher heat capacity than hot zone materials, and materials having smaller susceptance, in order to promote heating of the moldable material being primarily a function of the hot zone configuration.

FIG. 2

Figure 2:
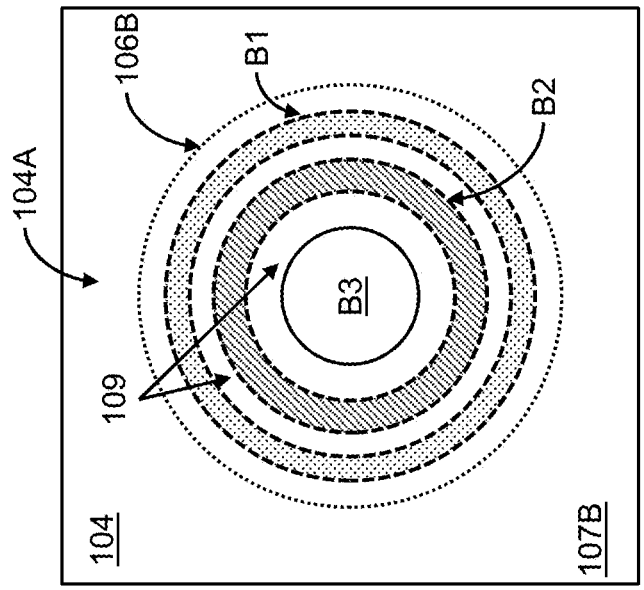
FIG. 2 depicts a top-down view of faces of an embodiment of a mold.
Figure 2:
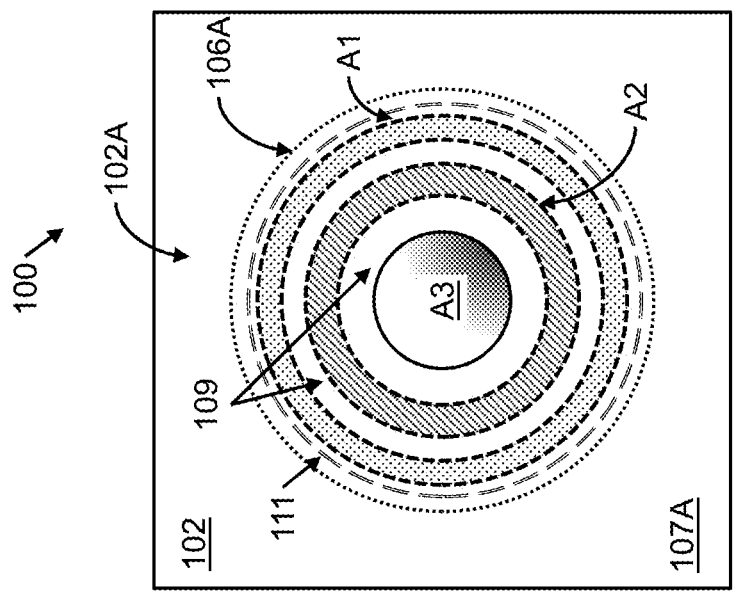

FIG. 2 depicts a top-down view of mold 100 with first piece 102 and second piece 104. First piece 102 has a facing surface 102A and second piece 104 has facing surface 104A that can be put in direct contact with facing surface 102A during use of the mold. Facing surface 102A extends out from a perimeter 111 of a mold cavity (see mold cavity 108 in FIG. 1) formed by the combination of engagement of the first piece 102 and the second piece 104. First piece 102 has hot zone 106A and cold zone 107A. Second piece 104 has hot zone 106B and cold zone 107B.

Hot zone 106A has the plurality of hot zone regions A1, A2, and A3, and hot zone 106B has the plurality of hot zone regions B1, B2, and B3. Hot zone regions are separated from each other by optional spacer volumes 109. Cold zone 107A surrounds hot zone 106A, and cold zone 107B surrounds hot zone 106B. Hot zone regions A1-A3 and B1-B3 may have different dimensions, including a width of a hot zone region and the penetration of a hot zone region into a mold body. In some embodiments where spacer volumes 109 are omitted, hot zone regions may touch each other. In some embodiments, a boundary between hot zone regions has a sharp delineation of a thermal characteristic across the boundary between hot zone regions. In some embodiments, the transition from one hot zone region to a second hot zone region may have a gradual change in the thermal characteristic of the hot zone.

Hot zone regions A1-A3 and B1-B3 may have a different thermal characteristic. The thermal characteristic that differs between the regions may be the microwave susceptance of the hot zone regions. According to an embodiment, hot zone region A3 may have a large microwave susceptance to heat a large-dimension volume of the mold cavity to a first peak temperature, and hot zone regions A1 and A2 may have smaller microwave susceptance in order to heat a small-dimension volume of the mold cavity to a second peak temperature smaller than the first peak temperature. Such uneven heating of a hot zone across hot zone regions may counteract uneven curing of moldable material in a mold cavity.

Hot zone regions that adjoin the volume of a mold cavity may have a same thermal characteristic, different from the thermal characteristic of the remainder of the hot zone. For example, hot zone region B3 in second piece 104 may have a microwave susceptance that is the same as the microwave susceptance of hot zone region A3 that adjoins the central volume of a mold cavity. The microwave susceptance of hot zone region B3 may be a larger than the microwave susceptance of hot zone regions B2 and B1, the ratio of microwave susceptance in these regions may be proportional to the ratio of microwave susceptance between hot zone region A3 and hot zone regions A2 and A1.

In some implementations of curing processes, the susceptance of material for use in a hot zone of a mold may be more than about 1.5 times the susceptance of material in a cold zone of a mold. A susceptance of material may impact curing temperatures of moldable material. Curing temperature of moldable material may relate to the total electromagnetic stimulation time of the mold around the moldable material, and relating to the amount of susceptor material in parts of the hot zone where electromagnetic stimulation occurs. In some implementations of curing processes, mold material may have a susceptance lower than about $0.0001°$ C./$(W*s*cm^3)$. In some instances, susceptance of a mold material in a hot zone and/or a cold zone may range from about $0.0003°$ C./$(W*s*cm^3)$ to about $0.00001°$ C./$(W*s*cm^3)$.

Microwave susceptance of materials in a microwaveable mold such as mold 100 may range from between about $0.0001°$ C./$(W*s*cm^3)$ to about $0.0003°$ C./$(W*s*cm^3)$ for hot zone materials, and from between about $0.00001°$ C./$(W*s*cm^3)$ to about $0.0001°$ C./$(W*s*cm^3)$ for cold zone materials. Upon heating by indirect stimulation, hot zones may achieve peak temperatures of between about $30°$ C. and $50°$ C. in order to cure moldable material in a mold cavity. In some implementations of curing processes that use indirect stimulation, a hot zone of a mold may be heated to a temperature from about $40°$ C. to about $100°$ C. with sufficient exposure time and a sufficiently good electromagnetic susceptor material in a hot zone.

Hot zone temperature upon electromagnetic stimulation may reach temperatures as great as about $200°$ C., but at an elevated risk of damage to moldable material and to any added parts in a mold cavity that are being overmolded during a curing process (see, e.g., the discussion regarding FIG. 3, below). Upon indirect stimulation of the hot zone of a mold, however, the cold zone of one or more mold pieces may be configured to achieve a temperature of not greater than about 40° C. for heating of the mold when curing moldable material. A ratio of microwave susceptance between the hot zone and the cold zone (i.e., hot zone susceptance divided by cold zone susceptance) of a mold may range from about 0.5 to about 4.0. Microwave susceptance of cold zone materials may be selected to be as small as possible in order to keep the mold cool for handling, and to reduce inadvertent heating of the moldable material by heat generated in the cold zone. According to an embodiment, microwave susceptance of a cold zone material may be no larger than about 0.75 the susceptance of a hot zone material in a mold in order to reduce overheating a moldable material during curing.

FIG. 3

Figure 3:
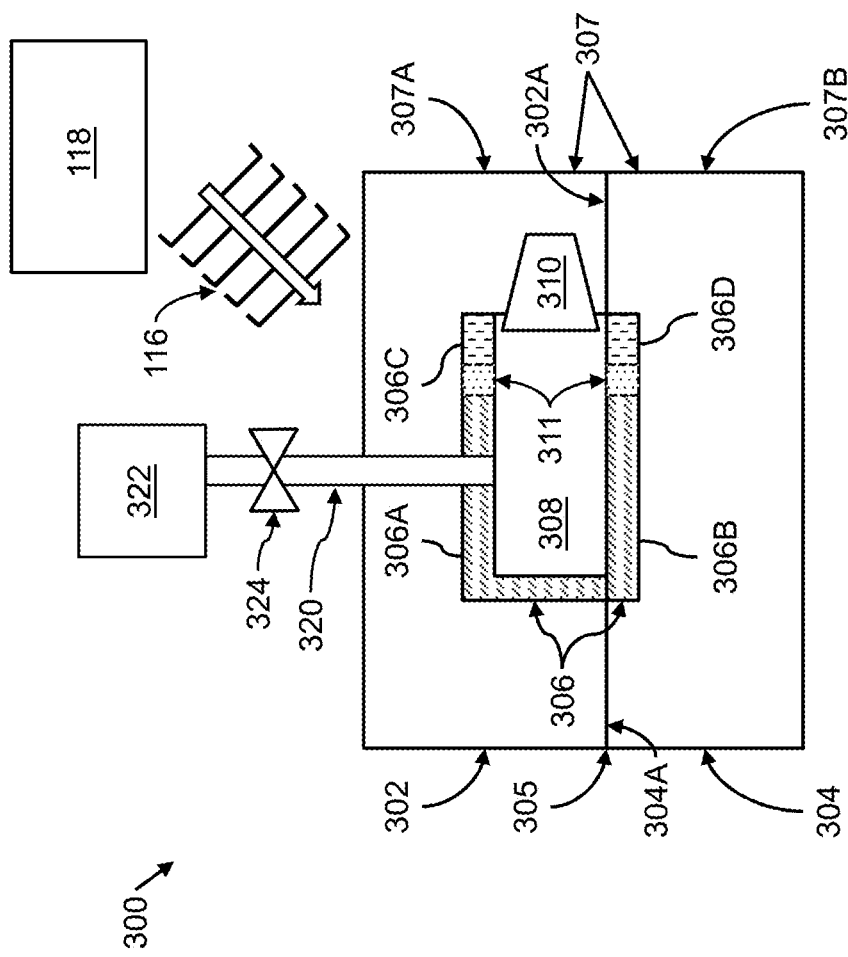
FIG. 3 depicts a cross-sectional diagram of an embodiment of a mold.

FIG. 3 depicts a cross-sectional diagram of an embodiment of a mold 300 configured to perform an overmolding process. In overmolding, a piece of material is introduced into a mold in order to be included in a molded part. The piece of material may provide structural rigidity, directional pliability, puncture resistance, or tear resistance of the molded part after curing is complete.

Mold 300 includes first piece 302 and second piece 304. First piece and second piece include hot zone 306 and cold zone 307. Mold cavity 308 is formed between first piece 302 and second piece 304 upon engagement of first piece 302 by second pieced 304 such that surfaces 302A and 304A are pressed together at interface 305. Cold zone 307 (307A in first piece 302, and 307B in second piece 304) may be configured to remain cool during indirect heating of moldable material in mold cavity 308. Moldable material may be introduced into mold cavity 308 through supply line 320 that penetrates through cold zone 307 and hot zone 306. Moldable material may flow from supply reservoir 322 through supply line 320, and flow may be regulated by opening and closing of flow valve 324 on supply line 320. Added part (the over molded part) 310 is included in mold cavity 308, and a portion of added part 310 is surrounded by moldable material once mold cavity 308 is filled from supply reservoir 322.

In this embodiment, hot zone 306 may be configured to have a different thermal characteristic than cold zone 307. Hot zone 306 may be configured to heat to a greater peak temperature than cold zone upon exposure of the mold to indirect stimulation by electromagnetic radiation 316 from energy source 118. An energy source that emits electromagnetic radiation may include a microwave generator in a microwave oven, including commercially microwave ovens for heating food, although other energy sources that emit electromagnetic radiation are also envisioned by the present disclosure. In some embodiments, an energy source emits microwave radiation having a frequency ranging from about 3000 MHz (megahertz) to about 500 MHz, although other radiation frequencies are envisioned. Some embodiments of an energy source generate microwave radiation with a wavelength between about 8 cm (centimeters) and about 45 cm. Some embodiments of energy sources used for heating a fluid medium may generate between 100 and 5000 W (watts) of electromagnetic radiation during operation of the energy source, although other delivered-power levels are envisioned. Electromagnetic radiation 116 from energy source 118 may penetrate mold 300 and stimulate heating of the mold in hot zone 306 such that heat conducts out of hot zone into moldable material in mold cavity 308 to cure the material. Mold 300 may be configured such that electromagnetic radiation may largely pass through cold zones 307A-B, while being absorbed by mold material in the hot zones 306A-D responsive to the electromagnetic stimulation by energy source 118.

Hot zone 306 may be and/or include multiple hot zone regions 306A-D in order to generate a non-uniform amount of heat through the hot zone upon electromagnetic stimulation. Hot zone regions 306C-D, which are between hot zone regions 306A-B and added object 310, may be configured to heat to a lesser degree than hot zone regions 306A-B upon indirect stimulation. A lesser degree of heating, or, heating to a lower peak temperature than in hot zones 302A-B, may be desirable in order to reduce thermal exposure of added part 310 during a curing process.

In some embodiments, a thermally uniform hot zone around a mold cavity may be employed in a mold when an added part 310 exhibits little sensitivity to the temperature range of the accelerated curing of the moldable material. A thermally uniform hot zone may be employed when the shape of the mold cavity is sufficiently uniform that even, as opposed to uneven, heating of moldable material by the hot zone is most efficient at enhancing the part curing rate without harming the moldable material. In an embodiment, a hot zone may entirely surround a mold cavity of a mold and heating of the mold material in mold cavity 308 may proceed caused by substantially uniform heating from the hot zone, which was in turn heated by the radiation source. As one non-limiting example, hot zone regions 306A-D may form a single unitary region (though separated into different halves of mold 300) having a same thermal characteristic throughout the individual hot zone regions that is uniformly heated. As another non-limiting example, hot zone regions 306A and 306B may be configured to achieve a same temperature as hot zone regions 306C and 306D (e.g., by virtue of the fact that they have the same thickness, the same density, and/or other properties as described herein that cause them to be heated the same amount and/or at the same rate by the radiation source in this example).

Overmolded parts (e.g., 310) may be susceptible to thermal damage upon surpassing a thermal damage threshold temperature. A thermal damage threshold temperature may be a melting point of a material included, and an overmolded material may melt, or deform, when the temperature of the curing moldable material becomes sufficiently large. A mold having a non-uniform distribution of a thermal characteristic through the hot zone may be better able to accommodate overmolding of added parts than a mold having a hot zone having a same thermal characteristic around the mold cavity. A thermally non-uniform hot zone may arise from a hot zone that partially surrounds a mold cavity, from portions of the hot zone formed from different materials, from portions of the hot zone with different dimensions, densities, and/or arrangements (e.g., as described herein), and/or for other reasons.

In some embodiments of a mold such as mold 300, hot zone regions 302C-D may be configured to generate lower peak temperatures than regions 302A-B. A mold having a thermally non-uniform hot zone may include hot zone regions such as 302A-B formed from a mold material with greater susceptance than the material of hot zone regions 302C-D. Further modification of the peak temperature experienced by added material 310 may be accomplished by increasing a dimension of the hot zone regions 306C-D to further separate added material 310 from hot zone regions 306A-B in mold 300 during a curing process. In some embodiments, hot zone 306 may include optional spacer regions 311 that separate hot zone regions, such as 306A and 306C, from each other. By including a spacer region in a hot zone, a further reduction of peak temperatures experienced by an added material such as added material 310 may be accomplished. In some embodiments of the present disclosure, the buffer material may be a same material as the mold material used to form the cold zone. In some embodiments, the buffer material may be an intermediate susceptor, having a susceptance between the susceptance of the cold zone and the susceptance of the hot zone.

Peak temperature of a hot zone region (e.g., 306-D) and surrounding materials such as added material 310 responsive to stimulation of the hot zone by electromagnetic radiation may be related to the total volume of susceptor material (e.g., the material used to form hot zones 306A-D) being electromagnetically stimulated, the amount of power applied, the wavelength of the applied electromagnetic radiation used to initiate heating, the shape of the material (e.g., the shape of hot zones 306A-D) being electromagnetically stimulated, a distribution of the material (e.g., arrangement and/or distribution of hot zones 306A-D in cold zones 307A-B and/or around mold cavity 308) being electromagnetically stimulated through a volume of mold material, a distance of the mold from the electromagnetic stimulation energy source, and a penetration distance of the electromagnetic radiation into the material (e.g., the material used to form hot zones 306A-D). Modifications of mold 100 may include modifications of the number of mold pieces, orientations of pieces, shapes of elements of the mold, relative positions of different hot zone regions in a hot zone, and dimensions of the hot zone and the cold zone surrounding a mold cavity formed by interior mold surfaces.

In a hot zone region (e.g., one of hot zone regions 306A-D), susceptance of a volume of material formed from a single material component, such as during a 3D printing process, may differ from susceptance of a volume of material that is made from two material components printed within the volume. Materials may be distributed within a volume of a hot zone at concentrations ranging from about 0% to about 100% according to a printing pattern of materials used to make the mold. Materials in a spacer region such as spacer region 311 may be different materials than in the hot zones that adjoin the spacer region (see hot zone regions 306A, 306C). In some embodiments, the spacer region material may be the same material as in the cold zone of a mold.

Concentration of a material in a volume of a hot zone region may be adjusted by 3D-printing two or more materials according to a predetermined pattern, and/or using other methods. Patterns of materials printed by 3D printing may have a material density for a first material ranging from between about 0% and about 100% in the hot zone region. Material may be deposited using liquid drops of a first material precursor that is cured on a mold substrate by, e.g., exposure to light having a suitable wavelength to trigger curing of the first material precursor to form the first material. Liquid drops of a first material precursor and a second material precursor may be deposited in patterns on a surface of the mold substrate during mold formation.

FIG. 4

Figure 4:
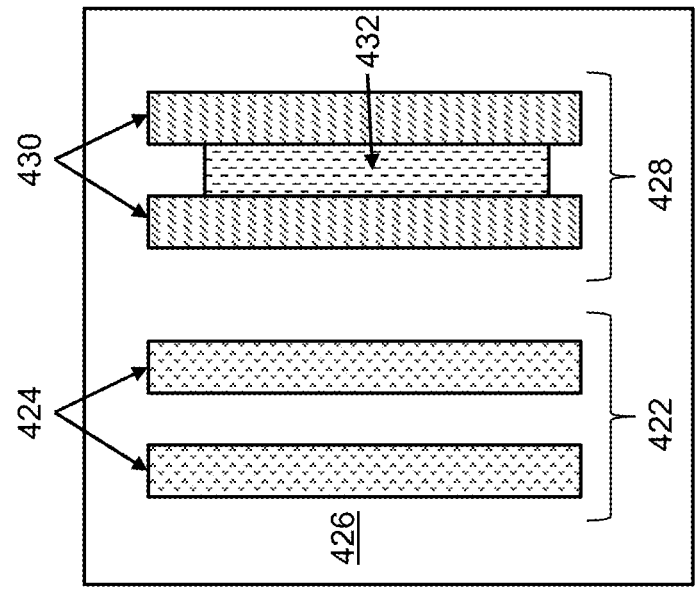
FIG. 4 depicts a top-down view of embodiments of deposition patterns of a microwave susceptor material.
Figure 4:
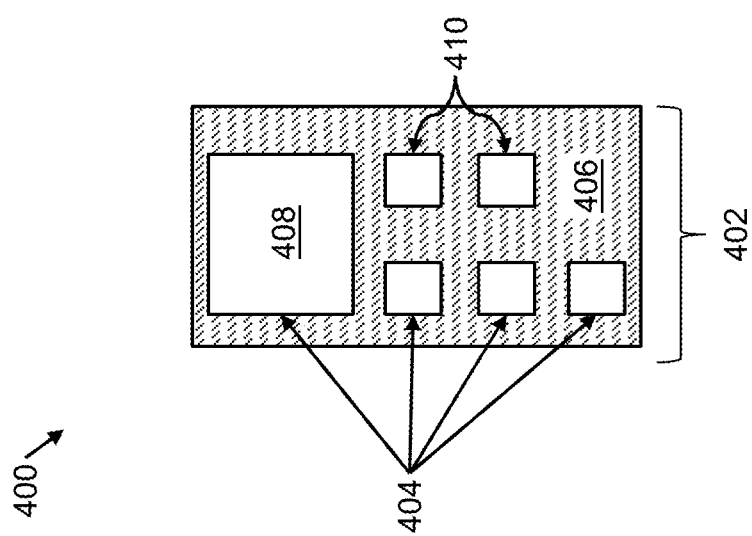

FIG. 4 depicts a top-down view of embodiments of deposition patterns of materials of a hot zone 400. Hot zone 400 may include a deposition pattern 402, where the deposition pattern has an array 404 and a field 406. In one non-limiting embodiment, array 404 may comprise a first material with a higher susceptance than a second material that makes up the field 406 of the deposition pattern 402. In one non-limiting embodiment, array 404 may comprise the second material with a lower microwave susceptance than a field 406 made of a first material that acts as a primary susceptor for a hot zone region. Deposition pattern 402 may arise from deposition and curing of a first material precursor and a second material precursor on a mold substrate. First material precursor and second material precursor may be liquid precursors deposited on a mold substrate by means such as 3D printing combined with light-induced curing of the precursors, and/or other materials. First material precursor and second material precursor may be solid materials that are deposited according to deposition pattern 402 and fused to become part of the mold substrate. Depositing solid materials may include deposition using forms of powder-based 3D printing.

Other methods of forming deposition pattern 402 and manufacturing a mold with configurable microwave susceptance may be apparent to one having ordinary skill in the art. A range of feature sizes may be included in array 404 according to a desired overall density of a first material in deposition pattern 402. Features of multiple sizes and shapes may be incorporated into a deposition pattern in order to regulate a density of a first material in a hot zone. Features may be square, rectangular, circular, rounded, annular, linear (see, e.g., lines of first material 424 separated and surrounded by material of field 426 in deposition pattern 422), and have other shapes selected to adjust a total density of a first material in a hot zone deposition pattern.

According to some embodiments of the present disclosure, multiple materials may be included in deposition pattern in order to incorporate a different thermal characteristic of each material in the deposition pattern. In one non-limiting example, lines 430 of a first material in deposition pattern 428 may be surrounded by material of a field 426 comprising a second material, and having a line 432 of a third material located between the lines 430 of the first material. By including two materials in the field 426, a first thermal characteristic of the hot zone region may be partially decoupled from a second thermal characteristic of the hot zone region. A combination of first material and second material in field 426 may allow for partially independent configuration of the thermal characteristics of the hot zone region wherein deposition pattern 428 may be located. In a non-limiting embodiment, a first material having a first hot zone may be selected for a first thermal characteristic, such as susceptance to heating by electromagnetic radiation stimulation, and a second material within may be selected for a different thermal characteristic, such as thermal conductivity.

FIG. 5

FIG. 5 depicts a flow diagram of a method 500 for making an embodiment of a mold. Method 500 may include a first operation 502 wherein an initial thermal exposure profile of the mold relative to the moldable material is determined. The initial thermal exposure profile of the mold relative to the moldable material may relate to the material that is being cured, the total volume of the mold cavity of the mold, and other parameters associated with a prototyping and/or manufacturing process. The initial thermal exposure profile of the mold relative to the moldable material may indicate the rate at which the mold (and/or individual materials used to form the mold, and/or individual regions of the mold) changes temperature relative to the rate at which the moldable material changes temperature when exposed microwave radiation, for example.

Method 500 may contain a second operation 504, wherein at least one hot zone material is selected for the mold pieces based on the initial thermal exposure profile, and an operation 506, wherein at least one cold zone material is selected for the mold pieces based on the initial thermal exposure profile. The at least one cold zone material may be selected to moderate the rate of heat loss from the hot zone of a mold, which can influence the energy input that generates a desired temperature in the hot zone around the mold cavity of the mold and in the moldable material located therein. Heat loss may be moderated by increasing a dimension of a cold zone surrounding some or all of a mold cavity and the hot zone that heats the mold cavity. Heat loss may be moderated by selecting a cold zone material that has a low thermal conductivity, slowing heat dissipation out of a mold cavity. Heat loss may be moderated by incorporating a volume of cold zone material shaped during a mold formation process to include insulating volumes. In some embodiments, insulating volumes may be air pockets formed in a mold body, volumes of a different material, and/or other volumes. In some embodiments, insulating volumes may be portions of material that have a different density than the remainder of cold zone material. In some embodiments, insulating volumes may be portions of material that have different thermal conductivity than a remainder of cold zone material.

Method 500 may contain an optional operation 508, wherein the mold cavity is evaluated for possible modifications to the materials and/or dimensions of the hot zone and/or cold zone. For example, a mold cavity having a partial volume with a large dimension may be heated to a desired temperature during curing by a hot zone region (or regions) having a stronger microwave absorption characteristic than a partial volume of the mold cavity having a smaller dimension. Microwave absorption of a hot zone region material (and/or materials) may be changed by modifying a size of the hot zone region, while keeping the innate susceptance of the materials unchanged (i.e., by using more of a single susceptor material in the hot zone region near the large volume). Microwave absorption of a hot zone region may be modified by selecting a different material with a larger innate susceptance, or may be modified by modifying the density of the susceptor material in the hot zone region (e.g., such as by depositing filler material between small segments of susceptor material).

Method 500 may include an optional operation 510, wherein, based on the evaluation result of optional operation 508, a determination is made on whether to modify the hot zone or to leave the hot zone unchanged. The determination may be based on a size ratio of partial volumes of the mold cavity. A partial volume of the mold cavity with a large volume may exceed a dimensional threshold, wherein a single hot zone material at a uniform distribution in the hot zone may be anticipated to result in non-uniform heating of the moldable material with resulting damage to the molded part and/or uneven curing outside of a curing specification. The dimensional threshold may be a percentage difference between the largest dimension of the large partial volume and the small partial volume of the mold cavity.

Method 500 may include an optional operation 512, wherein the initial thermal exposure profile of the mold is modified to produce an adjusted thermal profile of the mold. Modifications resulting in an adjusted thermal profile may include modifying a dimension of the hot zone, adding a buffer material between hot zone regions, dividing the hot zone into multiple hot zone regions, selecting a different material for at least one hot zone region, modifying a printing density of a hot zone material in a hot zone region, and modifying a dimension between the hot zone and the mold cavity. Method 500 may also include an operation 514, wherein the pieces of the mold are formed according to the adjusted thermal profile or the initial thermal profile, according to the determination of optional operation 510, if performed, or the initial thermal exposure profile if optional operation 510 is not performed.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for curing moldable material, the system comprising:
    a mold comprising internal mold surfaces forming a mold cavity, the mold formed from one or more materials configured to absorb microwave energy emitted by a source of microwave energy, the mold having a hot zone and a cold zone, wherein the hot zone and the cold zone differ by at least one physical characteristic so that the hot zone and the cold zone each absorb the microwave energy at different rates, wherein the hot zone absorbs the microwave energy at a higher rate than the cold zone, wherein the mold cavity is configured with a first dimension at a first location and a second dimension at a second location, and wherein the hot zone is configured to achieve, upon exposure to the microwave energy, a first temperature in a first region adjoining the first location and a second temperature in a second region adjoining the second location, the first temperature being larger than the second temperature.

2. The system of claim 1, wherein a first hot zone material in the first region is different than a second hot zone material in the second region.

3. The system of claim 1, wherein the first dimension is larger than the second dimension.

4. The system of claim 1, wherein the first region is configured to have a first susceptance and the second region is configured to have a second susceptance, the first susceptance being larger than the second susceptance.

5. The system of claim 4, wherein the first susceptance and the second susceptance are between $0.0003° C./(W*s*cm^3)$ and $0.00001° C./(W*s*cm^3)$.

6. The system of claim 1, wherein a susceptance of a region of the hot zone is configured by adjusting a deposition pattern of a first material having a first susceptance and a second material having a second susceptance, the first susceptance being larger than the second susceptance.

7. The system of claim 1, further comprising the source of microwave energy.

8. The system of claim 7, wherein the source of microwave energy is structured to emit microwave energy having a frequency in the range between 3000 MHz and 500 MHz.

\* \* \* \* \*